United States Patent
Tsuzuki et al.

(10) Patent No.: US 8,785,338 B2
(45) Date of Patent: Jul. 22, 2014

(54) GLASS WITH LOW SOLAR TRANSMITTANCE

(75) Inventors: Tatsuya Tsuzuki, Matsusaka (JP); Katsushi Yoshimura, Matsusaka (JP); Naoko Yoshimura, legal representative, Ise (JP); Kota Yoshimura, legal representative, Katsuura (JP); Marin Yoshimura, legal representative, Ise (JP); Karen Yoshimura, legal representative, Ise (JP); Takahiro Mori, Matsusaka (JP)

(73) Assignee: Central Glass Company, Limited, Ube-shi (JP)

(*) Notice: Subject to any disclaimer, the term of this patent is extended or adjusted under 35 U.S.C. 154(b) by 0 days.

(21) Appl. No.: 13/545,679

(22) Filed: Jul. 10, 2012

(65) Prior Publication Data

US 2013/0105722 A1     May 2, 2013

Related U.S. Application Data

(63) Continuation-in-part of application No. PCT/JP2011/061929, filed on May 25, 2011.

(30) Foreign Application Priority Data

Jun. 3, 2010     (JP) ................................ 2010-127945

(51) Int. Cl.
    *C03C 3/087*         (2006.01)
(52) U.S. Cl.
    USPC .......................................................... 501/71
(58) Field of Classification Search
    USPC .......................................................... 501/71
    See application file for complete search history.

(56) References Cited

U.S. PATENT DOCUMENTS

| | | | |
|---|---|---|---|
| 5,650,365 A | 7/1997 | Higby et al. | |
| 5,905,047 A * | 5/1999 | Sasage et al. | .......... 501/71 |
| 5,952,255 A | 9/1999 | Seto et al. | |
| 6,436,860 B2 | 8/2002 | Seto et al. | |
| 2008/0103039 A1 | 5/2008 | Jones | |

FOREIGN PATENT DOCUMENTS

| | | | |
|---|---|---|---|
| JP | 09208254 | * | 8/1997 |
| JP | 10-72236 A | | 3/1998 |
| JP | 10-95632 A | | 4/1998 |
| JP | 2740103 B2 | | 4/1998 |
| JP | 10-139475 A | | 5/1998 |
| JP | 11-512694 A | | 11/1999 |
| JP | 2001-206731 A | | 7/2001 |
| JP | 2008-105940 A | | 5/2008 |

OTHER PUBLICATIONS

PCT/ISA/237 Form (Four (4) pages).
International Search Report including English translation dated Aug. 23, 2011 (Five (5) pages).

* cited by examiner

*Primary Examiner* — Karl Group
(74) *Attorney, Agent, or Firm* — Crowell & Moring LLP

(57) ABSTRACT

Disclosed is a glass with low solar transmittance, which is characterized by that it has a basic composition of soda-lime-silica glass, that it contains as coloring components 0.70-1.70 mass % of $Fe_2O_3$ (total iron in terms of ferric iron), 0.15-0.45 mass % of FeO (ferrous iron), 0-0.8 mass % of $TiO_2$, 100-350 ppm of CoO, 0-60 ppm of Se, 100-700 ppm of $Cr_2O_3$, and 3-150 ppm of MnO, that it has a ratio ($Fe^{2+}/Fe^{3+}$) of ferrous iron to ferric iron of 0.20-0.80. This glass has superior ultraviolet absorbing performance and infrared absorbing performance (heat insulation performance) and an appropriate transparency.

7 Claims, No Drawings

GLASS WITH LOW SOLAR TRANSMITTANCE

TECHNICAL FIELD

The present invention relates to a glass with a low solar transmittance, which is superior in ultraviolet absorption performance and infrared absorption performance (heat insulation performance), while having an appropriate transparency.

SUMMARY OF THE INVENTION

In recent years, from the viewpoints of human and material adverse effects, such as decoloration and deterioration of articles or skin sunburn, and of energy saving, such as air-conditioning load reduction, in not only architectural window glass, but also automotive one, etc., there has been a drastically increasing need for a plate glass article connected to a higher habitability and a higher safety in terms of human and material by providing the glass itself or glass surface with multiple functions, such as having ultraviolet reflection and absorption, etc. in addition to heat reflection and absorption. In particular, as an automotive window glass, there is a demand for a glass having a superior ultraviolet or infrared shielding performance, from the viewpoints of energy saving, such as air-conditioning load reduction, the prevention of deterioration of car interior materials, and the passenger comfort, and for a glass that is relatively low in visible light transmittance from the viewpoint of privacy protection.

As such glass, for example, there is proposed a neutral grayish tone glass, which contains coloring components formed of 0.45-0.75 weight % of $Fe_2O_3$ (total iron), 0-0.7 weight % of $TiO_2$, 0.014-0.025 weight % of CoO, 0-0.035 weight % of NiO, 0-0.0035 weight % of $Cr_2O_3$, and 0.001-0.006 weight % of Se, and has at a thickness of 3 mm a visible light transmittance of 50% or less, a solar transmittance of 55% or less, an ultraviolet transmittance of 25% or less, etc. (see Patent Publication 1).

Furthermore, for example, one is disclosed, in which a soda-lime-silica glass is used as the basic composition, and which contains as a coloring component basically each of 0.75-1.5 weight % of $Fe_2O_3$ (total iron), 70-250 ppm of CoO, 10-50 ppm of Se, and 0-330 ppm of NiO or/and $Cr_2O_3$, and has at a thickness of 3.5 mm in a illuminant D65 measurement a visible light transmittance (TV) of 50% or less, a solar transmittance (TS) of 45% or less, and an ultraviolet transmittance (TUV) of 15% or less, and moreover there is proposed a dark grayish glass, which has an ultraviolet transmittance TUV 350 on a wavelength of 350 nm of 8% or less and an ultraviolet transmittance TUV 370 on a wavelength of 370 nm of 35% or less (see Patent Publication 2).

Furthermore, for example, there is proposed an ultraviolet and infrared absorbing, low-transmission glass, which contains a basic glass composition composed of 65-80 weight % $SiO_2$, 0-5 weight % $Al_2O_3$, 0-10 weight % MgO, 5-15 weight % CaO (MgO+CaO=5-15%), 10-18 weight % $Na_2O$, 0-5 weight % $K_2O$ ($Na_2O+K_2O$=10-20%), and 0-5 weight % of $B_2O_3$, and a coloring agent composed of 1.0-1.6 weight % $Fe_2O_3$ (total iron), 0.0019-0.05 weight % CoO, 0.0008-0.003 weight % of Se, and 0.05-0.1 weight % of NiO, and has at a thickness of 1.8-5 mm a visible light transmittance (YA) of 5-25%, a solar transmittance (TG) of 5-25%, and an ultraviolet transmittance (TUV) of 15% or less (see Patent Publication 3).

Furthermore, for example, there is proposed an ultraviolet and infrared absorbing, low-transmission glass, which contains a basic glass composition composed of 65-80 weight % $SiO_2$, 0-5 weight % $Al_2O_3$, 0-10 weight % MgO, 5-15 weight % CaO, 5-15 weight % MgO+CaO, 10-20 weight % $Na_2O$, 0-5 weight % $K_2O$, 10-20 weight % $Na_2O+K_2O$, and 0-5 weight % $B_2O_3$, and as coloring components 0.7-0.95 weight % total iron oxide (T-$Fe_2O_3$) in terms of $Fe_2O_3$, 1.1-2.3 weight % $TiO_2$, 0-2.0 weight % $CeO_2$, 0.013-0.025 weight % CoO, 0-0.0008 weight % Se, and 0.01-0.07 weight % NiO, and has at a thickness of 3.1 mm to 5 mm a visible light transmittance of 25-45% and a solar transmittance of 10-40% (see Patent Publication 4).

Furthermore, for example, there is proposed a neutral colored, low-radiation-transmittance glass, which is a neutral colored soda-lime-silica glass composition and is composed of 68-75 weight % $SiO_2$, 10-18 weight % $Na_2O$, 5-15 weight % CaO, 0-5 weight % MgO, 0-5 weight % $Al_2O_3$, 0-5 weight % $K_2O$, and 0-5 weight % BaO, and as coloring agents about 1.2-2 weight % $Fe_2O_3$ (total iron in terms of weight % value of $Fe_2O_3$), about 0.01-0.05 weight % NiO, about 0.02-0.04 weight % $Co_3O_4$, about 0.09-3 weight % $TiO_2$, and 0.0002-0.005 weight % Se, and in which, at a thickness of 4 mm, when a visible light transmittance (standard illuminant A) is in a range of 40-50%, the total solar energy transmittance is lower than the visible light transmittance by at least 15%, and, when the visible light transmittance is lower than 40%, the total solar energy transmittance is lower than 25% (see Patent Publication 5).

PRIOR ART PUBLICATIONS

Patent Publications

Patent Publication 1: Japanese Patent 2740103.
Patent Publication 2: Japanese Patent Application Publication 10-72236.
Patent Publication 3: Japanese Patent Application Publication 2001-206731.
Patent Publication 4: Japanese Patent Application Publication 10-139475.
Patent Publication 5: Japanese Patent Application Publication 11-512694.

SUMMARY OF THE INVENTION

As mentioned above, the neutral grayish tone glass described in Japanese Patent 2740103 and the dark grayish glass described in Japanese Patent Application Publication 10-72236 are each superior in ultraviolet absorbing performance, but they do not necessarily have a superior infrared absorbing performance sufficiently.

Furthermore, the ultraviolet and infrared absorbing, low-transmission glass described in Japanese Patent Application Publication 2001-206731, the ultraviolet and infrared absorbing, low-transmission glass described in Japanese Patent Application Publication 10-139475, and the neutral colored, low-radiation-transmittance glass described in Japanese Patent Publication 11-512694 are each superior in ultraviolet and infrared absorbing performance, but they contain NiO component as a coloring component, and its amount is large as being 100 ppm or higher. Therefore, upon the glass production, there is a high risk of forming nickel sulfide leading to natural breakage of glass. Thus, it is difficult to say that they are glasses suitable for window glasses of architectural use, vehicular use, etc., from the viewpoint of the certification of the product quality or safety.

It is almost impossible to find nickel sulfide during the production. Therefore, there is also a method of previously artificially break a glass that is subjected to natural breakage due to nickel sulfide, by conducting a reheating by a heat soak test (a heat treatment test). The total elimination is difficult, and the heat treatment test takes a very long time.

The present invention was made in view of such conventional defects and more easily and efficiently provides a glass with low solar transmittance, which has $Fe_2O_3$—CoO—Se—$Cr_2O_3$—MnO series coloring components and has superior ultraviolet absorbing performance and infrared absorbing performance (heat insulating performance) by suitably variously combining the component compositions, which improves habitability and safety by also having an appropriate transparency, and which can have a light weight with various shapes.

According to the present invention, there is provided a glass (a first glass) with low solar transmittance, characterized by that it has a basic composition of soda-lime-silica glass, that it contains as coloring components 0.70-1.70 mass % of $Fe_2O_3$ (total iron in terms of ferric iron), 0.15-0.45 mass % of FeO (ferrous iron), 0-0.8 mass % of $TiO_2$, 100-350 ppm of CoO, 0-60 ppm of Se, 100-700 ppm of $Cr_2O_3$, and 3-150 ppm of MnO, that it has a ratio ($Fe^{2+}/Fe^{3+}$) of ferrous iron to ferric iron of 0.20-0.80, that it has a solar transmittance of 30% or less, a visible light transmittance of 5-30% and an ultraviolet transmittance of 30% or less in terms of 4 mm thickness by a measurement using illuminant A, and that it has a ratio of the visible light transmittance to the solar transmittance of 0.50 or greater and a ratio of the ultraviolet transmittance to the solar transmittance of 1.25 or less.

The first glass may be a glass (a second glass) with low solar transmittance, which is characterized by that $CeO_2$ is 2.0 mass % or less.

The first or second glass may be a glass (a third glass) with low solar transmittance, which is characterized by that NiO is 100 ppm or less.

Any one of the first to third glasses may be a glass (a fourth glass) with low solar transmittance, which is characterized by that a transmitted light obtained by a measurement with illuminant D65 has a dominant wavelength of 480-580 nm in term of 4 mm thickness.

Any one the first to fourth glasses may be a glass with low solar transmittance, which is characterized by that the basic composition of soda-lime-silica glass comprises 65-80 mass % of $SiO_2$, 0-5 mass % of $Al_2O_3$, 0-10 mass % of MgO, 5-15 mass % of CaO, 5-15 mass % of MgO+CaO, 10-18 mass % of $Na_2O$, 0-5 mass % of $K_2O$, 10-20 mass % of $Na_2O+K_2O$, and 0.05-0.50 mass % of $SO_3$.

Advantageous Effect of the Invention

It is possible by the present invention to obtain a glass with low solar transmittance, which is superior in ultraviolet absorbing performance and infrared absorbing performance (heat insulating performance) and also has an appropriate transparency.

DETAILED DESCRIPTION

In the present invention, herein, as the coloring components, 0.70-1.70 mass % of $Fe_2O_3$ (total iron in terms of ferric iron), 0.15-0.45 mass % of FeO (ferrous iron), a ratio ($Fe^{2+}/Fe^{3+}$) of ferrous iron to ferric iron of 0.20-0.80, 0-0.8 mass % of $TiO_2$, 100-350 ppm of CoO, 0-60 ppm of Se, 100-700 ppm of $Cr_2O_3$, and 3-150 ppm of MnO are basically each contained. The reason of this is that they are necessary for securing superior ultraviolet and infrared absorbing performance and an appropriate transparency by basically balancing the component composition of $Fe_2O_3$ and $TiO_2$ for ultraviolet absorption, the component composition of FeO for infrared absorption, and the component composition of CoO, Se, $Cr_2O_3$ and MnO for color tone and the lowering of visible light transmittance.

It is made to have 0.70-1.70 mass % of $Fe_2O_3$ (total iron in terms of ferric iron), 0.15-0.45 mass % of FeO (ferrous iron), a ratio ($Fe^{2+}/Fe^{3+}$) of ferrous iron to ferric iron of 0.20-0.80. The reason of this is that they are the amount of $Fe_2O_3$ (total iron), the amount of FeO (ferrous iron), and the ratio ($Fe^{2+}/Fe^{3+}$) of ferrous iron to ferric iron, which are necessary for making the glass have necessary ultraviolet and infrared absorbing performances simultaneously with a good balance by both the ultraviolet absorbing performance by $Fe_2O_3$ and the infrared absorbing performance by FeO and for making the target desired optical characteristics satisfactory.

If $Fe_2O_3$ (total iron) is less than 0.70 mass %, its ultraviolet and infrared absorbing performance becomes insufficient. On the other hand, if it exceeds 1.70 mass %, there occurs a difficulty such as the time being necessary for a change to a glass body having a different composition, in the case of conducting a continuous production with a glass melting furnace. Therefore, it is not preferable.

Therefore, it is made to be 0.70-1.70 mass %, preferably 0.70-1.50 mass %, more preferably 0.70-1.30 mass %.

Furthermore, if FeO (ferrous iron) is less than 0.15 mass %, its infrared absorbing performance becomes insufficient. On the other hand, if it exceeds 0.45 mass %, there is a danger that the temperature of a melting tank's ceiling portion becomes higher than the heatproof temperature upon melting by its radiant heat due to its infrared absorbing performance. Furthermore, there occurs a difficulty such as the time being necessary for a change to a glass body having a different composition, in the case of conducting a continuous production with a glass melting furnace. Therefore, it is not preferable.

Therefore, it is made to be 0.15-0.45 mass %, preferably 0.20-0.45 mass %, more preferably 0.20-0.40 mass %.

Furthermore, if the ratio ($Fe^{2+}/Fe^{3+}$) of ferrous iron to ferric iron is less than 0.20 or exceeds 0.80, the balance of its ultraviolet absorbing performance or infrared absorbing performance becomes inferior. Moreover, the color tone's change tends to occur even further in the sheet forming step of float method or the like and in the heat treatment step of a tempered glass or curved plate glass, etc. Therefore, it is not preferable.

Therefore, it is made to be 0.20-0.80, preferably 0.20-0.70, more preferably 0.20-0.60.

The adjustment of the ratio ($Fe^{2+}/Fe^{3+}$) of ferrous iron to ferric iron is conducted by the raw materials, such as carbon and mirabilite, and the furnace operation, such as combustion condition. Furthermore, for example, the introduction of oxygen gas or a mixed gas containing oxygen gas, air, or a combustion exhaust gas having an increased oxygen gas concentration, etc., or a combined gas of these into the atmosphere in the adjustment region of the glass melting furnace may also contribute to the color tone stabilization.

$TiO_2$ is made to be 0-0.8 mass %, since it is a component that increases the ultraviolet absorbing performance by an interaction with FeO under normal conditions, but it is a component that absorbs the visible region, too. If it exceeds 0.8 mass %, it becomes necessary to lower the amount of $Fe_2O_3$ (total iron) in the glass body due to the increase of absorption of the visible region. Since this becomes disadvantageous overall, it is not preferable.

Therefore, it is made to be 0-0.8 mass %, preferably 0-0.5 mass %.

It is made to be 100-350 ppm of CoO, 0-60 ppm of Se, 100-700 ppm of $Cr_2O_3$, and 3-150 ppm of MnO. This is because optical characteristics, such as a desired color tone or transmittance, can be obtained by suitably adjusting the component composition of a $Fe_2O_3$—CoO—Se—$Cr_2O_3$—MnO series within the above ranges, while iron (yellow, blue), cobalt (blue), selenium (pink, or brown by a combination with iron), chromium (green, pale yellow), and manganese (purple, pale orange) make their expressions, respectively. Although Se is not an essential component, a Se-containing glass composition is preferable. The content of Se is preferably 1-50 ppm.

In particular, MnO is an essential component that fulfills an important role in the present invention, since it contributes to maintenance of Se, which is highly-volatile and toxic upon melting the glass, and can be an alternative to a pink color of the Se, and since it is a component for increasing the ultraviolet absorbing performance by $Fe_2O_3$. If it is less than 3 ppm, its advantageous effects become insufficient. On the other hand, if it exceeds 150 ppm, it tends to generate solarization. Therefore, it is not preferable. Thus, it is made to be 3-150 ppm, preferably 5-150 ppm, more preferably 10-100 ppm.

$CeO_2$ exists in the form of $Ce^{3+}$ or $Ce^{4+}$ in glass. It is a component to improve ultraviolet absorbing performance and may be added in one's discretion. In the case of $CeO_2$ alone, particularly $Ce^{3+}$ is effective for ultraviolet absorption, while it has a limited absorption in visible region. By making it coexistent with $TiO_2$ in glass, it is also possible to obtain the effect of ultraviolet absorption by an interaction with $Ti^{4+}$. However, 2.0 mass % or lower is preferable to avoid the high cost due to the use of $CeO_2$ of high price.

NiO brings the formation of nickel sulfate in glass. Therefore, its inclusion is not preferable. Nickel sulfate can almost not be seen visually and does not harm glass under normal conditions. Since it is high in thermal expansion coefficient, the glass entire surface may instantly be broken into pieces by losing stress balance due to its volume expansion upon thermal tempering or the like.

Therefore, it is made to be 100 ppm or less, preferably 50 ppm or less, more preferably 30 ppm, still more preferably substantially no inclusion.

Furthermore, it is optional to add ZnO in a range of 0.5 mass % or less in order to suppress the generation of nickel sulfate. Exceeding this results in a high cost, due to the use of ZnO raw material of high price. Therefore, it is not preferable. Thus, it is made to be 0.5 mass % or less, more preferably 0.3 mass % or less.

Furthermore, it is optional to add 1.0 mass % or less, preferably 0.5 mass % or less, of $V_2O_5$, $MoO_3$, CuO, $SnO_2$, etc. to the extent that the function of the present invention is not impaired, to a glass having a compositional range of the present invention, for adjusting the color tone and the degree of reduction and for other purposes.

The glass is made in terms of 4 mm thickness to have a solar transmittance of 30% or less, a visible light transmittance of 5-30% and an ultraviolet transmittance of 30% or less by a measurement using illuminant A, and a ratio of the visible light transmittance to the solar transmittance of 0.50 or greater and a ratio of the ultraviolet transmittance to the solar transmittance of 1.25 or less, and a dominant wavelength of 480-580 nm by a measurement with illuminant D65. The reason of this is to make them have superior ultraviolet absorbing performance and infrared absorbing performance while having an appropriate transparency as various privacy-protecting glasses, to reduce human and material adverse effects, such as decoloration and deterioration of articles or skin sunburn by ultraviolet rays, to improve car interior and indoor habitability, for example, by increasing the air-conditioning effect, and to make it mild to car and outdoor environments.

Preferably, at 4 mm thickness, the solar transmittance is 25% or less, the visible light transmittance is 5-30%, and the ultraviolet transmittance is 20% or less, and the ratio of the visible light transmittance to the solar transmittance is 0.65 or greater, and the ratio of the ultraviolet transmittance to the solar transmittance of 1.0 or less. More preferably, the solar transmittance is 20% or less, the visible light transmittance is 5-30%, and the ultraviolet transmittance is 15% or less, and the ratio of the visible light transmittance to the solar transmittance is 0.80 or greater, and the ratio of the ultraviolet transmittance to the solar transmittance of 0.8 or less.

Furthermore, the basic composition of the soda-lime-silica glass was made to be basically a plate glass composition containing 65-80 mass % $SiO_2$, 0-5 mass % $Al_2O_3$, 0-10 mass % MgO, 5-15 mass % CaO (the total of MgO and CaO is 5-15 mass %), 10-18 mass % $Na_2O$, 0-5 mass % $K_2O$ (the total of $Na_2O$ and $K_2O$ is 10-20 mass %), and 0.05-0.5 mass % $SO_3$.

$SiO_2$ component is made to be 65-80 mass %. The reason of this is that, when it is less than 65 mass %, weathering or the like tends to be generated on the surface, resulting in lowering of weather resistance to cause a problem in practical use and that, when it is greater than 80 mass %, its easy temperability is lowered, and melting also becomes difficult.

The reason why $Al_2O_3$ component is made to be 0-5 mass % is that, when it exceeds 5 mass %, devitrification tends to occur, the forming temperature range becomes narrow, and the production becomes difficult.

The reason why MgO is made to be 0-10 mass % is that, when it exceeds 10 mass %, easy temperability lowers.

The reason why CaO component is made to be 5-15 mass % is that, when it is less than 5 mass %, easy temperability lowers, it tends to become insufficient as a flux, the melting temperature also becomes high, the flow temperature is not made to be low, and therefore the production becomes difficult and that, when it exceeds 15 mass %, devitrification tends to occur, the forming operation range becomes narrow, and the production becomes difficult.

The reason why the total amount of MgO and CaO is made to be 5-15 mass % is that MgO and CaO components are used for lowering the melting temperature, that, when it is less than 5 mass %, easy temperability lowers, and that, when it exceeds 15 mass %, devitrification tends to occur, and it becomes difficult in production.

The reason why $Na_2O$ component is made to be 10-18 mass % is that, when it is less than 10 mass %, easy temperability lowers, forming performance becomes difficult, and devitrification also tends to occur, thereby narrowing the operation range and making the production difficult, and that, when it exceeds 18 mass %, weather resistance lowers, and weathering or the like tends to be generated on the surface to cause a problem in practical use.

The reason why $K_2O$ component is made to be 0-5 mass % is that, when it exceeds 5 mass %, weather resistance lowers, and the cost also becomes high.

The reason why the total amount of $Na_2O$ and $K_2O$ is made to be 10-20 mass % is that, when it is less than 10 mass %, easy temperability lowers, devitrification also tends to occur, the operation temperature range becomes narrow in forming, and the production becomes difficult and that, when it exceeds 20 mass %, weather resistance lowers to cause a problem in practical use, and it becomes high in terms of cost, too.

EXAMPLES

In the following, the present invention is explained based on examples.

As a glass raw material, there was used silicon dioxide, aluminum oxide, sodium carbonate, calcium carbonate or magnesium oxide. As coloring agents, there were added predetermined amounts of ferric oxide, titanium oxide, cerium oxide, cobalt oxide, selenium (added in the form of sodium selenite), chromium oxide, and manganese oxide. Furthermore, sodium sulfate and a carbon-based reducing agent (specifically carbon powder) were added to the glass raw material within a range of the coloring component, followed by mixing. This raw material was melted by heating at 1480° C. in an electric furnace.

After melting at 1480° C. for 5 hours, the temperature was lowered to 1420° C. by spending 1 hour. After maintaining it for 30 minutes more, the glass body was poured into a graphite mold to have a plate glass shape, followed by sufficiently conducting annealing till room temperature to obtain a glass plate having a thickness of about 10 mm. Then, this glass plate was subjected to an optical polishing until the thickness became about 4 mm, to prepare a sample having a dimension of 100 mm×100 mm for the glass component compositional analysis and the measurement of various optical characteristics, etc.

The glass component compositional analysis was conducted with respect to $Fe_2O_3$, $TiO_2$, $CeO_2$, CoO, Se, $Cr_2O_3$, and MnO, and a trace component composition of the order of ppm derived from impurities, etc. was analyzed with respect to only NiO. Furthermore, regarding the ratio ($Fe^{2+}/Fe^{3+}$) of ferrous iron to ferric iron, the amount of FeO was determined from the transmittance at a wavelength of about 1100 nm in infrared region in a spectral transmittance curve measured at a plate thickness of 4 mm, and the calculation was conducted from the amount of total iron ($Fe_2O_3$) of the above-mentioned analysis values.

Optical characteristics were evaluated with a U4000 type automated spectrophotometer (made by Hitachi Ltd.). With illuminant A, at a thickness of 4 mm, solar transmittance (%) and ultraviolet transmittance (%) were determined according to convention "A" of the International Organization for Standardization (ISO) 13837, visible transmittance (%) was determined according to JIS R3106-1998, and furthermore dominant wavelength (nm) was determined according to JIS Z8701-1995.

Examples (sample Nos. 1-13) of the present invention are shown in Table 1 and Table 2, and comparative examples (sample Nos. 1 and 2) are shown in Table 3.

TABLE 1

| Example | | No. | 1 | 2 | 3 | 4 | 5 | 6 |
|---|---|---|---|---|---|---|---|---|
| Glass Composition | $SiO_2$ | (mass %) | 71.0 | 70.8 | 70.5 | 71.5 | 71.7 | 71.7 |
| | $Al_2O_3$ | (mass %) | 2.1 | 2.1 | 2.2 | 2.0 | 2.1 | 2.1 |
| | CaO | (mass %) | 8.5 | 8.9 | 8.9 | 8.4 | 8.5 | 8.5 |
| | MgO | (mass %) | 3.4 | 3.5 | 3.6 | 3.4 | 3.4 | 3.4 |
| | $Na_2O$ | (mass %) | 12.7 | 12.5 | 12.4 | 12.3 | 11.8 | 11.9 |
| | $K_2O$ | (mass %) | 1.0 | 1.1 | 1.1 | 1.0 | 1.0 | 1.0 |
| | $SO_3$ | (mass %) | 0.1 | 0.3 | 0.2 | 0.1 | 0.2 | 0.1 |
| Coloring Components | $Fe_2O_3$ (total iron) | (mass %) | 0.71 | 0.76 | 1.00 | 1.12 | 1.14 | 1.14 |
| | FeO | (mass %) | 0.28 | 0.18 | 0.30 | 0.36 | 0.27 | 0.35 |
| | $Fe^{2+}/Fe^{3+}$ | | 0.76 | 0.37 | 0.49 | 0.56 | 0.35 | 0.50 |
| | $TiO_2$ | (mass %) | 0.44 | | | | | |
| | CoO | ppm | 220 | 245 | 235 | 130 | 229 | 232 |
| | Se | ppm | 5 | 35 | 28 | 16 | 17 | 20 |
| | $Cr_2O_3$ | ppm | 309 | 280 | 259 | 296 | 256 | 256 |
| | MnO | ppm | 5 | 53 | 4 | 4 | 12 | 13 |
| | NiO | ppm | 6 | 3 | 3 | 4 | 4 | 2 |
| Optical Characteristics | solar transmittance | % | 25.0 | 26.7 | 17.7 | 18.4 | 21.7 | 16.5 |
| | visible transmittance | % | 27.4 | 18.3 | 16.7 | 25.6 | 21.1 | 18.1 |
| | ultraviolet transmittance | % | 26.3 | 12.3 | 11.9 | 14.3 | 13.4 | 12.6 |
| | visible transmittance/solar transmittance | | 1.10 | 0.69 | 0.94 | 1.39 | 0.97 | 1.10 |
| | ultraviolet transmittance/solar transmittance | | 1.05 | 0.46 | 0.67 | 0.78 | 0.62 | 0.76 |
| | dominant wavelength | nm | 485 | 485 | 494 | 531 | 488 | 489 |

TABLE 2

| Example | | No. | 7 | 8 | 9 | 10 | 11 | 12 | 13 |
|---|---|---|---|---|---|---|---|---|---|
| Glass Composition | $SiO_2$ | (mass %) | 71.4 | 71.6 | 70.5 | 71.4 | 71.4 | 71.4 | 71.1 |
| | $Al_2O_3$ | (mass %) | 2.1 | 2.1 | 2.2 | 2.0 | 2.1 | 2.1 | 2.1 |
| | CaO | (mass %) | 8.5 | 8.5 | 8.9 | 8.4 | 8.5 | 8.5 | 8.5 |
| | MgO | (mass %) | 3.4 | 3.4 | 3.5 | 3.4 | 3.4 | 3.4 | 3.4 |
| | $Na_2O$ | (mass %) | 12.2 | 12.0 | 12.4 | 12.2 | 11.9 | 11.9 | 11.9 |
| | $K_2O$ | (mass %) | 1.0 | 1.0 | 1.1 | 1.0 | 1.0 | 1.0 | 1.0 |
| | $SO_3$ | (mass %) | 0.2 | 0.1 | 0.1 | 0.2 | 0.2 | 0.2 | 0.2 |
| Coloring Components | $Fe_2O_3$ (total iron) | (mass %) | 1.14 | 1.14 | 1.18 | 1.23 | 1.41 | 1.42 | 1.65 |
| | FeO | (mass %) | 0.33 | 0.42 | 0.20 | 0.35 | 0.23 | 0.25 | 0.29 |
| | $Fe^{2+}/Fe^{3+}$ | | 0.48 | 0.69 | 0.23 | 0.47 | 0.22 | 0.24 | 0.24 |
| | $TiO_2$ | (mass %) | | | | | | | |
| | CoO | ppm | 162 | 305 | 242 | 219 | 213 | 229 | 216 |
| | Se | ppm | 20 | 21 | 26 | 20 | 46 | 40 | 44 |

TABLE 2-continued

| Example | | No. | 7 | 8 | 9 | 10 | 11 | 12 | 13 |
|---|---|---|---|---|---|---|---|---|---|
| | $Cr_2O_3$ | ppm | 548 | 252 | 274 | 314 | 260 | 263 | 252 |
| | MnO | ppm | 4 | 5 | 3 | 5 | 16 | 14 | 16 |
| | NiO | ppm | 4 | 3 | 4 | 6 | 5 | 3 | 4 |
| Optical Characteristics | solar transmittance | % | 17.3 | 11.9 | 21.3 | 16.3 | 20.9 | 18.9 | 15.6 |
| | visible transmittance | % | 21.2 | 12.3 | 14.3 | 18.6 | 17.8 | 15.4 | 14.0 |
| | ultraviolet transmittance | % | 12.0 | 11.7 | 4.5 | 11.7 | 5.2 | 4.8 | 3.3 |
| | visible transmittance/ solar transmittance | | 1.23 | 1.03 | 0.67 | 1.14 | 0.85 | 0.81 | 0.90 |
| | ultraviolet transmittance/ solar transmittance | | 0.69 | 0.98 | 0.21 | 0.72 | 0.25 | 0.25 | 0.21 |
| | dominant wavelength | nm | 544 | 484 | 573 | 493 | 571 | 568 | 570 |

TABLE 3

| | | | Com. Example No. | |
|---|---|---|---|---|
| | | | 1 | 2 |
| Glass Composition | $SiO_2$ | (mass %) | 72.0 | 70.7 |
| | $Al_2O_3$ | (mass %) | 2.1 | 2.1 |
| | CaO | (mass %) | 8.5 | 8.4 |
| | MgO | (mass %) | 3.4 | 3.5 |
| | $Na_2O$ | (mass %) | 12.0 | 12.1 |
| | $K_2O$ | (mass %) | 1.0 | 1.0 |
| | $SO_3$ | (mass %) | 0.1 | 0.2 |
| Coloring Components | $Fe_2O_3$ (total iron) | (mass %) | 0.74 | 0.86 |
| | FeO | (mass %) | 0.41 | 0.01 |
| | $Fe^{2+}/Fe^{3+}$ | | 1.63 | 0.01 |
| | $TiO_2$ | (mass %) | | 0.02 |
| | $CeO_2$ | | | 1.23 |
| | CoO | ppm | 245 | |
| | Se | ppm | 24 | |
| | $Cr_2O_3$ | ppm | 311 | |
| | MnO | ppm | 4 | |
| | NiO | % | 3 | |
| Optical Characteristics | solar transmittance | % | 13.6 | 71.7 |
| | visible transmittance | % | 15.1 | 79.4 |
| | ultraviolet transmittance | | 18.7 | 2.5 |
| | visible transmittance/ solar transmittance | | 1.11 | 1.11 |
| | ultraviolet transmittance/ solar transmittance | nm | 1.38 | 0.03 |
| | dominant wavelength | nm | 486 | 571 |

As is clear from Tables, since each composition is in an appropriate range, each sample of Examples 1-13 is a glass having optical characteristics that, at a thickness of 4 mm, solar transmittance is 30% or lower, visible transmittance is 5-30%, ultraviolet transmittance is 30% or lower, the ratio of visible transmittance to solar transmittance is 0.50 or higher, and ultraviolet transmittance to solar transmittance is 1.25 or lower. Therefore, these examples' glasses are ones having a superior ultraviolet and infrared absorbing performance and an appropriate transparency.

In contrast with these, the samples of Comparative Examples 1 and 2 are not appropriate in terms of compositional ranges. Therefore, they resulted in no possibility of being used as a low-solar-transmittance glass to have an ultraviolet and infrared absorbing performance and an appropriate transparency.

INDUSTRIAL APPLICABILITY

The present invention is one to obtain a low-solar-transmittance glass having superior ultraviolet absorbing performance and infrared absorbing performance (heat insulation performance) and having an appropriate transparency. It can be applied to a wide field, such as not only architectural and vehicular uses, which are mild in human and material, but also watercraft or aircraft window glass and various glass articles.

The invention claimed is:

1. A glass with low solar transmittance, comprising:
a basic composition of soda-lime-silica glass, and
as coloring components
0.70-1.70 mass % of $Fe_2O_3$ (total iron in terms of ferric iron),
0.15-0.45 mass % of FeO (ferrous iron),
0-0.8 mass % of $TiO_2$,
100-350 ppm by mass of CoO,
1-50 ppm by mass of Se,
100-700 ppm by mass of $Cr_2O_3$, and
3-150 ppm by mass of MnO,
and having a ratio ($Fe^{2+}/Fe^{3+}$) of ferrous iron to ferric iron of 0.20-0.80, a solar transmittance of 30% or less, a visible light transmittance of 5-30% and an ultraviolet transmittance of 30% or less in terms of 4 mm thickness by a measurement using an illuminant A, a ratio of a visible light transmittance to a solar transmittance of 0.50 or greater and a ratio of a ultraviolet transmittance to the solar transmittance of 1.25 or less.

2. The glass with low solar transmittance according to claim 1, comprising 2.0 mass % or less of $CeO_2$.

3. The glass with low solar transmittance according to claim 1 comprising 100 ppm or less of NiO.

4. The glass with low solar transmittance according to claim 1, having a dominant wavelength of 480-580 nm of a transmitted light in terms of 4 mm thickness of the glass obtained by a measurement with an illuminant D65.

5. The glass with low solar transmittance according claim 1, wherein the basic composition of soda-lime-silica glass comprises 65-80 mass % of $SiO_2$, 0-5 mass of $Al_2O_3$, 0-10 mass % of MgO, 5-15 mass % of CaO, 5-15 mass % of MgO+CaO, 10-18 mass % of $Na_2O$, 0-5 mass % of $K_2O$, 10-20 mass % of $Na_2O+K_2O$, and 0.05-0.50 mass of $SO_3$.

6. The glass with low solar transmittance according to claim 1, comprising 5-46 ppm by mass of the Se.

7. The glass with low solar transmittance according to claim 1, comprising 3-53 ppm by mass of the MnO.

* * * * *